Figure 1:
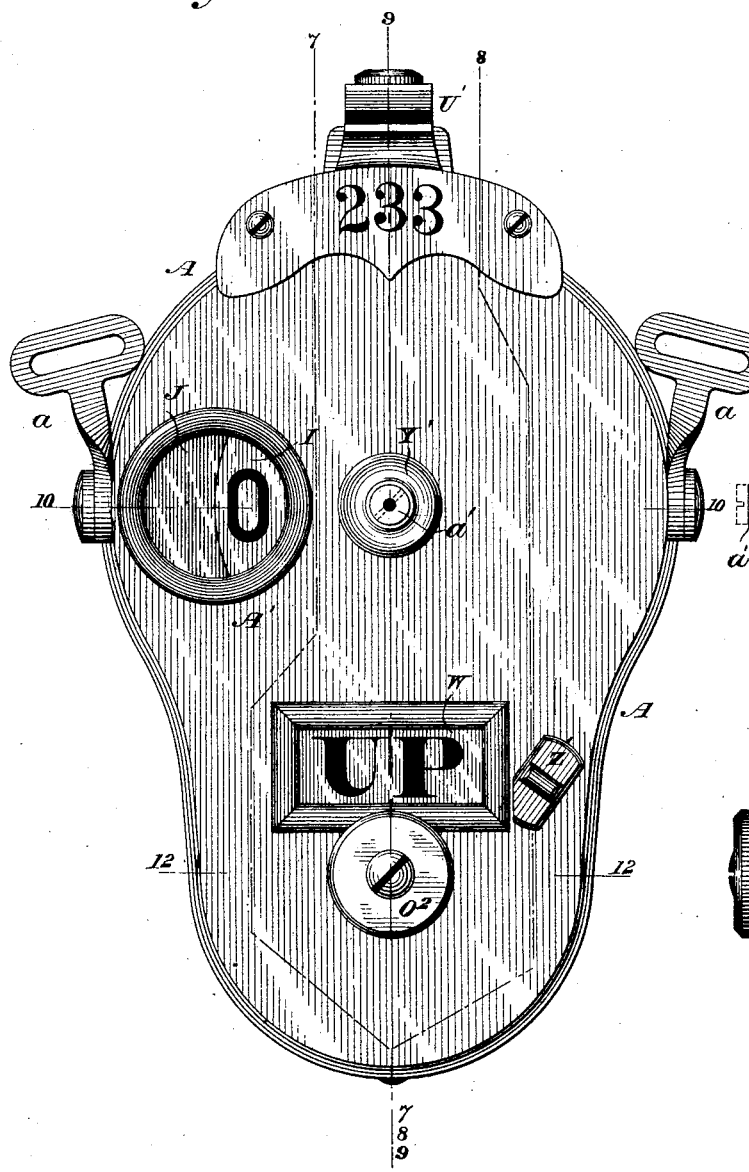

6 Sheets—Sheet 1.

J. B. BENTON.
Fare-Register.

No. 225,044. Patented Mar. 2, 1880.

WITNESSES
Wm. A. Skinkle,
Geo. W. Buck.

INVENTOR
John. B. Benton.
By his Attorneys
Baldwin, Hopkins & Peyton

N. PETERS, PHOTO-LITHOGRAPHER, WASHINGTON, D. C.

6 Sheets—Sheet 2.

J. B. BENTON.
Fare-Register.

No. 225,044. Patented Mar. 2, 1880.

WITNESSES
Wm A. Skinkly.
Geo. W. Breck.

INVENTOR
John B. Benton.

By his Attorneys
Baldwin, Hopkins & Peyton

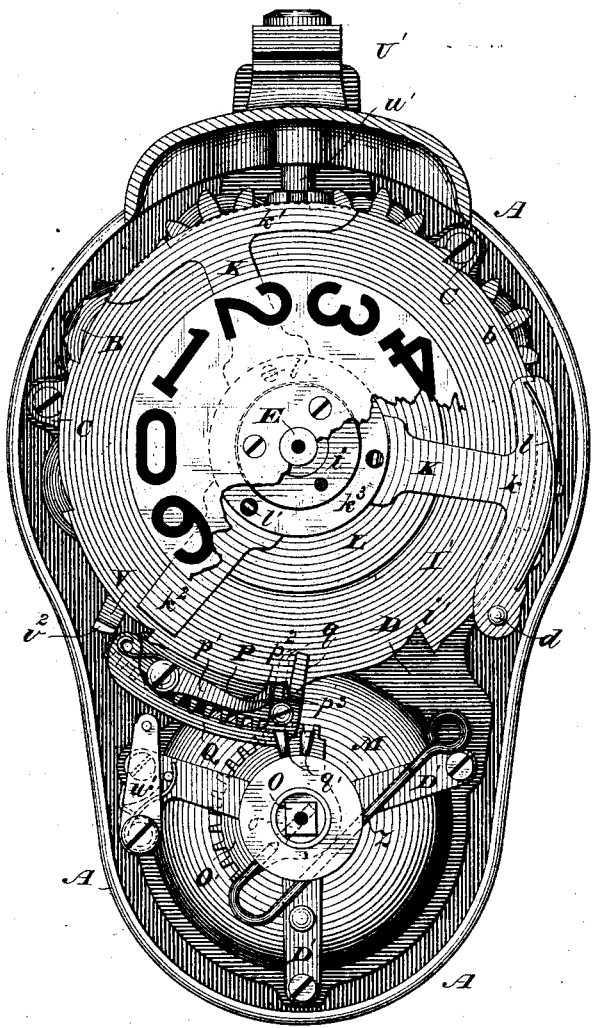

J. B. BENTON.
Fare-Register.
No. 225,044. Patented Mar. 2, 1880.
Fig. 5.
Fig. 9.
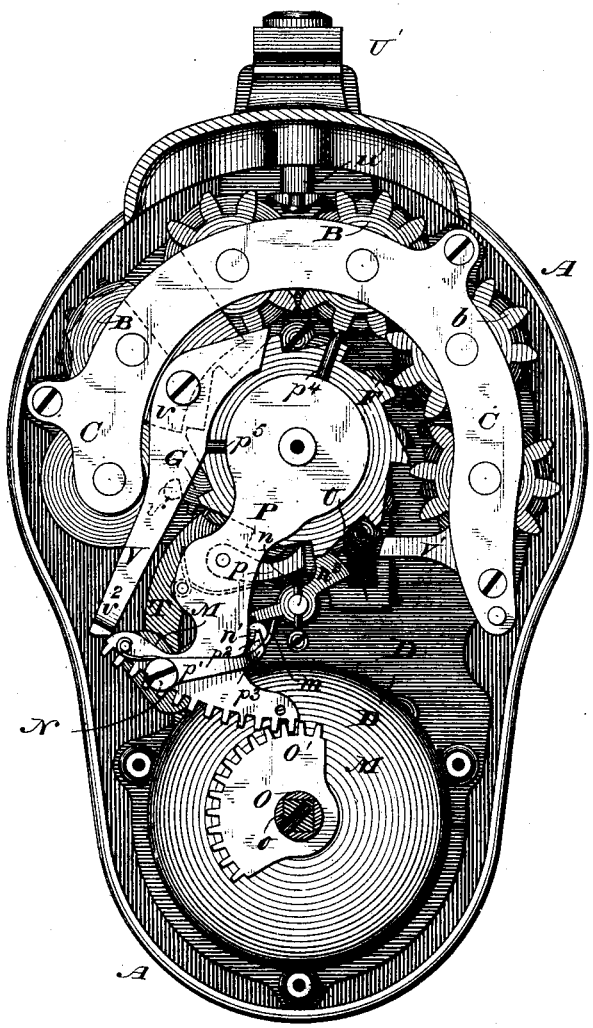
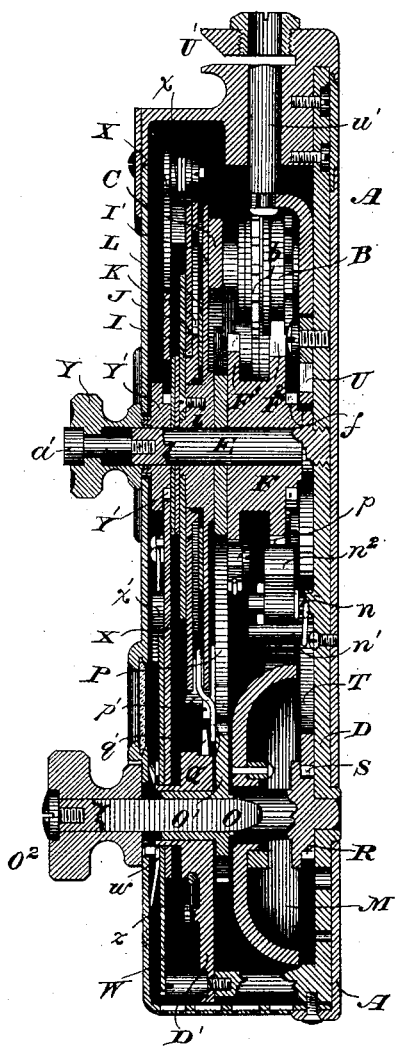
WITNESSES
Wm. A. Skinkly
Geo. W. Breck.
INVENTOR
John B. Benton.
By his Attorneys
Baldwin, Hopkins & Peyton J. B. BENTON.
Fare-Register.

No. 225,044.  Patented Mar. 2, 1880.

WITNESSES
Wm. A. Skinkly.
Geo. W. Buck.

INVENTOR
John B. Benton.
By his Attorneys
Baldwin, Hopkins & Peyton

6 Sheets—Sheet 6.

J. B. BENTON.
Fare-Register.

No. 225,044. Patented Mar. 2, 1880.

WITNESSES
Wm A. Skinkle
Geo. W. Breck

INVENTOR
John B. Benton,
By his Attorneys
Baldwin, Hopkins & Peyton

N. PETERS, PHOTO-LITHOGRAPHER, WASHINGTON, D.C.

UNITED STATES PATENT OFFICE.

JOHN B. BENTON, OF NEW YORK, ASSIGNOR TO THE RAILWAY REGISTER MANUFACTURING COMPANY, OF BUFFALO, N. Y.

FARE-REGISTER.

SPECIFICATION forming part of Letters Patent No. 225,044, dated March 2, 1880.

Application filed January 5, 1880.

*To all whom it may concern:*

Be it known that I, JOHN B. BENTON, of the city, county, and State of New York, have invented certain new and useful Improvements in Registering-Machines, of which the following is a specification.

My invention relates more especially to registering-machines of the class exemplified in reissued Letters Patent No. 7,290, of September 5, 1876, and in original Letters Patent No. 167,057, of August 24, 1875, which Letters Patent show machines especially organized for the purpose of registering, counting, or tallying the number of fares received by conductors or collectors on passenger cars or vehicles, the conductor or collector being required, as each fare is collected, to operate the machine, which operation registers the fare and sounds an alarm to indicate to those in the car that the registry has been properly made. In said machines so exemplified in said Letters Patent are combined two (or duplex) sets of registering mechanisms and an alarm apparatus simultaneously operated by a common actuator or prime-mover. One of said registering mechanisms, which is commonly called a "general" register, is for the purpose of permanently and consecutively registering the fares collected on a great number of trips of the car or vehicle, being capable of consecutively registering or tallying a large number of fares, while the other of said registering mechanisms, which is commonly called a "trip-register," is for the purpose of consecutively registering the fares collected on each trip or direction of travel of the car or vehicle only, the said trip-register having the capacity of being set to zero or the starting-point at the beginning of each trip to commence tallying or registering anew.

In Letters Patent No. 206,565, of July 30, 1878, granted to Charles B. Harris, of New York city, is shown the combination of duplex-registering mechanism, (or a trip and general register,) a punch, and an alarm; and said Letters Patent also show, combined with a register, a direction-indicator, to indicate the direction of travel of the car or vehicle. In Letters Patent No. 218,421, granted to me August 12, 1879, are shown, among other things, certain improvements in registers embodying the Harris direction-indicator and the Harris duplex register and punch combinations; and there is also shown in said Letters Patent the combination of a trip-register, a general register, and a ticket-punch, all actuated simultaneously by a common actuator or prime mover.

My present invention contemplates, like my invention covered by my aforesaid Letters Patent of August 12, 1879, a register embodying in its organization a trip-register, a general register, an alarm, a punch, mechanism for simultaneously operating said registers, alarm, and punch, and a direction-indicator, and constitutes an improvement upon the registers shown in the above-cited Letters Patent, my said invention consisting of certain new constructions, combinations, and organizations of devices which are recited at the close of this specification.

The accompanying drawings show all my present improvements as embodied in the best way now known to me. Some of my improvements, however, may be used without the others, and in registering-machines differing somewhat from the one organized, as represented in said drawings. The details of construction shown in the drawings may also be modified in various ways within certain limits without departing from the spirit of my invention.

Figure 2:
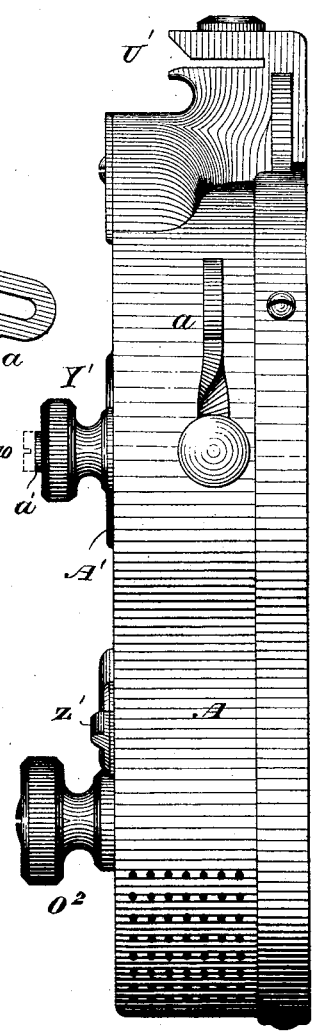
Figure 3:
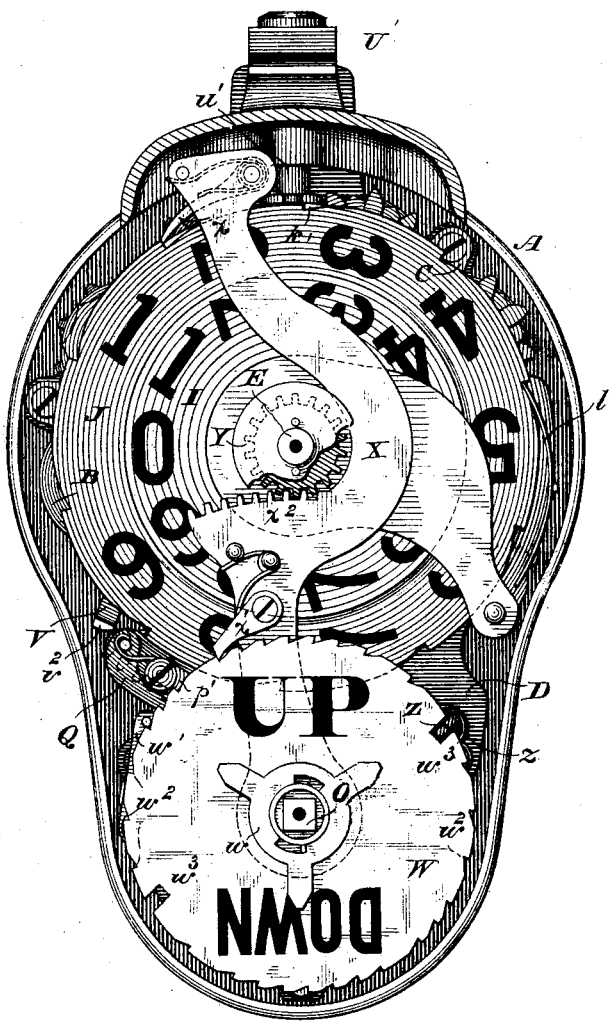
Figure 7:
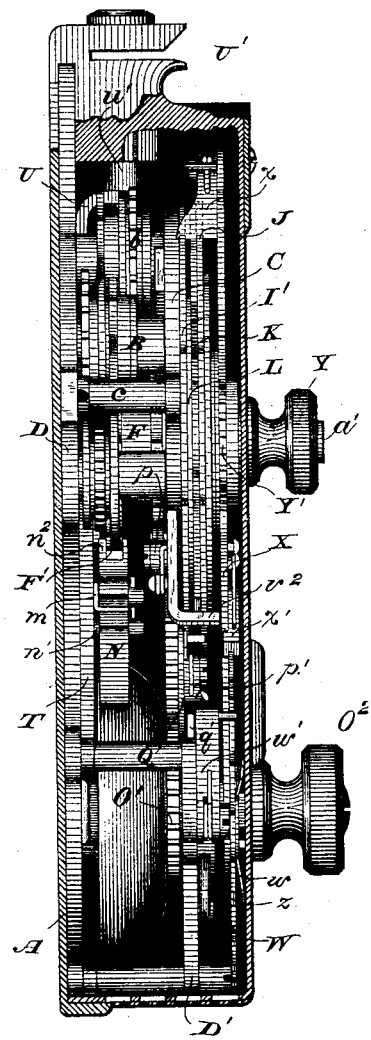
Figure 6:
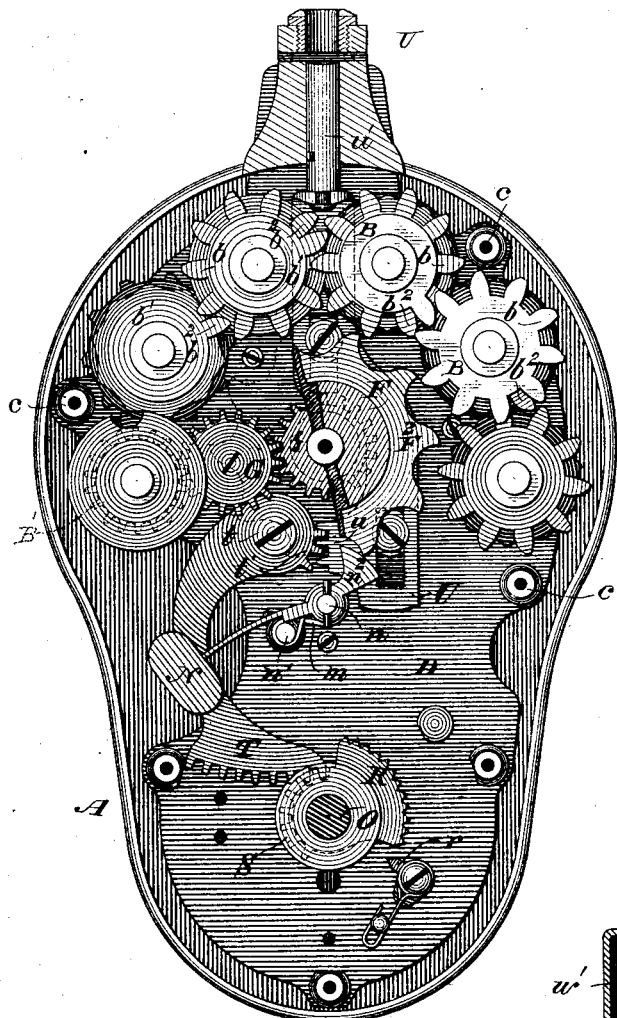
Figure 13:
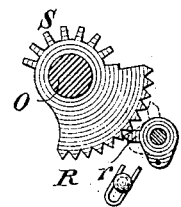
Figure 12:
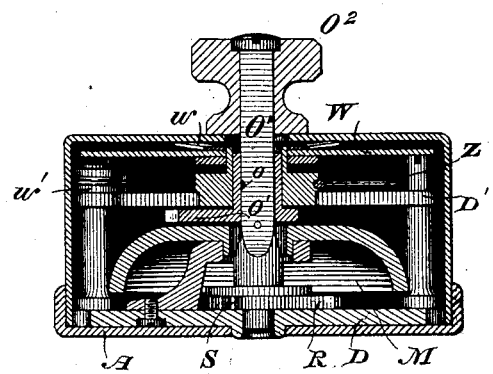
Figure 11:
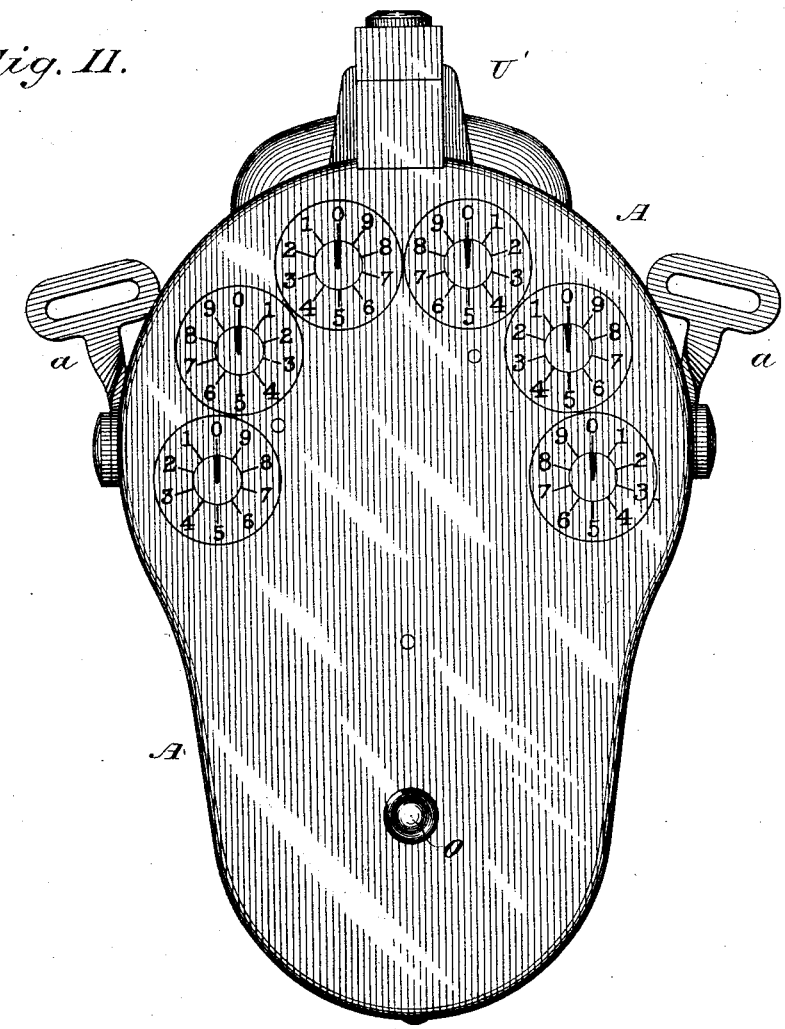
Figure 10:
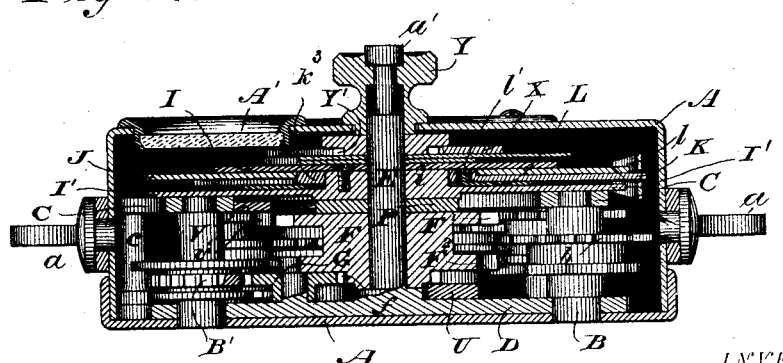

Figure 1 is a front elevation of my improved fare-register, the trip-register being at zero or the starting-point, and the direction of travel indicated as up. Fig. 2 is a side elevation thereof. Fig. 3 is a front view with the face-plate of the register removed to show the internal parts of the apparatus, a part of the resetting mechanism of the trip-register being in section. Fig. 4 is a front view, showing the internal parts of the apparatus beneath the direction plate or indicator, the units-disk of the trip-register being partly broken away and the tens-disk thereof removed. Fig. 5 is a front view, showing the internal parts of the apparatus beneath the trip-disks and direction plate or indicator, said disks and indicators having been removed; and Fig. 6 is a front view, showing the internal parts of the apparatus immediately adjacent to the back plate of the register, the trip-disks, direction plate or indicator, alarm-bell, and other parts being removed, the view showing more particularly the devices for actuating the punch and for compelling a full movement of the actuator (which is common to the punch, registers, and alarm) in both directions of its travel or movement in operating the machine in the process of registering. Fig. 7 is a longitudinal central section through the register-casing on the line 7 7 of Fig. 1, showing an edge view of the internal parts of the register looking from the left-hand side or edge of the machine as depicted in Fig. 1. Fig. 8 is a similar section on the line 8 8 of Fig. 1 looking from the right-hand edge or side of the machine, as shown in Fig. 1; and Fig. 9 is a longitudinal section through the whole apparatus on the line 9 9 of Fig. 1 to clearly illustrate its construction. Fig. 10 is a transverse section through the apparatus on the line 10 10 of Fig. 1. Fig. 11 is a view of the back of the register, showing the index of the general or continuously-counting register. Fig. 12 is a transverse section through the apparatus on the line 12 12 of Fig. 1; and Fig. 13 is a view of the devices for moving the punch-bar and for compelling a full movement of the actuator of the machine, detached.

The casing A of the register is preferably of a flat tapering curvilinear form, like the casings of the Harris register, patented as aforesaid, and of my own former register shown in my aforesaid patent of August 12, 1879, the operative parts of the mechanism being organized, in the present instance, upon the same general principle as that shown in said Letters Patent—that is, with the registering mechanism arranged in the upper enlarged end of the casing, and with the alarm mechanism arranged in the lower and smaller end of said casing. The said casing A is provided with the usual pivoted loops $a$, by which the register may be attached to the person of the conductor or collector.

The registering mechanism proper consists of two sets—a trip or temporary register to consecutively record, count, or tally the number of fares collected on each trip or direction of travel of the car or vehicle, said trip-register having the capacity of being readily set to zero or the starting-point, and a general, permanent, or continuously-counting register, which consecutively records, counts, or tallies the whole number of fares collected on all or a great number or a series of trips, said general register being incapable of the resetting movement given to the trip-register.

The general register is composed of a train or series of registering-wheels, B, (six in number, in this instance,) of well-known construction, preferably operating on the principle of the well-known Geneva-stop wheels, the said wheels being mounted upon and turning with suitable shafts or axles having their bearings in front in a suitable supporting-plate, C, fixed upon posts $c$, rising from a base-plate, D, upon which the operative parts of the register are mounted, (or from the back plate of the machine, if preferred,) and in rear in suitable bearings in said base-plate D or the back plate of the register-casing.

This general or continuously-counting register is capable of registering or tallying a large number of fares. The first wheel registers units, the next tens, the next hundreds, and so on, each wheel except the unit-wheel being provided with ten teeth or notches, $b$, and all except the last wheel with a plate, $b'$, having an actuating tongue or projection, $b^2$, which at every complete revolution of its wheel turns the next highest counting-wheel the distance of one tooth, or one-tenth of a revolution.

The construction and operation of this class of multiplying registering mechanism are too well understood to need elaborate description, although the concentric arrangement of the series of wheels is advantageous, as stated in my patent of August 12, 1879, hereinbefore mentioned. The rear ends of the shafts of the said general register-wheels extend through the base-plate D and back plate of the register-casing, and lie flush with the exterior surface of said back plate, as clearly shown in Fig. 11, being preferably provided each with a notch or mark in lieu of index fingers or pointers, which, in connection with suitable dials (graduated to correspond with the teeth in the wheels) formed upon the casing, one dial for each wheel, enables the register to be read off at a glance, and obviates all danger of successful tampering with or manipulation of the general register.

Within the central space created by the concentric arrangement of the general register-wheels B is mounted a shaft, axle, or arbor, E, the rear end of which is firmly fixed or fastened to the supporting base-plate D, which plate is fastened by suitable devices—screws, for instance—to the back plate of the register-casing. Upon this fixed arbor or shaft E is mounted a circular hub, F, having the capacity of turning around the shaft E when actuated in the process of counting, as will be presently explained.

Said hub F carries near its lower end a toothed or spur wheel, $f$, firmly fixed thereto; or the hub itself may have the spur-teeth cut thereon, as in the present instance, which is the preferred construction. The said spur-wheel $f$ meshes with the teeth of an idle spur-wheel, G, which latter wheel in turn meshes with a spur-wheel, B', fixed to the shaft of the unit-wheel B of the general register, and actuates said unit-wheel in the process of registering. The hub F is also provided with two ratchet-wheels, F' F$^2$, which are either fixed upon or formed with the hub, one above the other and above the spur-wheel $f$, each of said wheels F' F$^2$ having ten teeth in the present instance, and are for purposes to be hereinafter explained.

The trip-register consists of two flat circular disks, I J, preferably of different diameters or size, mounted upon the upper end of the fixed axle or shaft E in the upper end of the casing, one above the other, and overlapping the general register, around which shaft E said disks turn in the process of registering, the top or smaller disk, I, which is the unit-disk, being provided on its face, around the edge, with the figures 0 to 9, inclusive, while the lower or tens disk, J, is provided with the numerals 1 to 9, inclusive, a blank space being left between 9 and 1, as usual.

For convenience in reading or inspecting the trip-register, and to enable the passengers to see that the fares are properly registered, I provide a window or opening, A', in the front plate of the casing and cover it with some transparent substance, such as glass, to prevent tampering with the disks or with the mechanism which governs and controls their movements.

Beneath the tens-disk J of the trip-register there is mounted a circular plate, I', corresponding in size to the tens-disk J, and constituting the medium by which the unit-disk I receives its motion from the actuator of the register, the said units-disk I being firmly connected with the plate I', (which I term the "units-disk carrying-plate,") while mounted above the tens-disk J, the connection being formed, in this instance, by a central hub, $i$, of the carrying-plate I', which passes through a central opening in the tens-disk J, the units-disk being fastened to the hub by screws passing through said disk into the said hub $i$, as clearly shown in Figs. 4, 9, and 10. The said units-disk I and its actuating carrying-plate I' are thus permitted to turn freely in the process of counting units independently of the tens-disk, while the said tens-disk, at every complete revolution of the units-disk, turns one-tenth of a revolution simultaneously with the tenth actuation of the units-disk if started from zero, the two disks being moved together by a common actuator, as hereinafter explained.

The edges or periphery of the tens-disk J and carrying-plate I' of the units-disk I are notched or provided with teeth or projections at suitable distances apart (ten being formed in this instance) in both the disk J and plate I', said notches or teeth constituting in this instance the means for both actuating the trip-register in the process of counting and for resetting it to the starting-point or zero, it being noted that one of the notches (designated in Fig. 4 as $i'$) in the plate I' of the units-disk is deeper than the rest, which is for a purpose hereinafter mentioned.

Interposed between the units-disk I and its carrying-plate I', and surrounding the hub $i$ of said plate I', is a preferably three-armed plate, K, mounted, by one of its arms $k$, upon a post or stud, $d$, rising from the base-plate D, the three arms $k\ k'\ k^2$ of said plate radiating from a central ring or annulus, $k^3$, fitting the hub $i$ of the units-disk carrying-plate I', as aforesaid.

The arms $k\ k'$ are T-shaped, it will be observed, and are curved upon their outer ends to conform to the shape of the plate I' and tens-disk J. Suitable detent dogs or springs $l\ l$, formed in this instance from a single plate-spring, are mounted upon the arm $k$ of the plate K, and engage with the teeth formed in the periphery of the disk J and carrying-plate I' to prevent back movement of the trip-disks, while the arm $k'$ of the three-armed plate K serves a purpose hereinafter explained in connection with the resetting mechanism.

The central ring or annulus, $k^3$, of the plate K is provided with suitable openings, (see Fig. 4,) in which lips $l'$, turned up from a circular spring-plate washer, L, fit to maintain the said spring-plate or washer in proper position to exert friction between the plate K and the movable units-disk carrying-plate I', and consequently, also, between the said plate K and the tens-disk J, which disk is between the units-disk I and plate K, and rests upon said plate K, turning around its annulus or ring $k^3$ as an axis. This friction-spring L is for the purpose of steadying the two dials of the trip-register, and prevents either of them from moving too freely, counteracting, in part, the momentum given to the disks when actuated in the process of counting.

Below the registering mechanisms, and in the smaller end of the casing A, is secured the alarm apparatus, which, preferably, consists of a stationary bell, M, and a bell-hammer, N, the arm or lever of which is pivoted at $n$ to a suitable post or stud upon the frame D, and is normally held out of contact with the bell by a suitable post or projection, $n'$.

The hammer is actuated by the teeth of the ratchet-wheel F², fixed upon or formed with the hub F, as before described, the end $n^2$ of the hammer-arm, which is acted upon by the wheel to raise it against the tension or force of a spring, $m$, being formed so as to act as a detent or dog to prevent backlash or movement of the hub.

The actuator or prime mover of the apparatus, which is common to both sets of register mechanism (the trip and general registers) and to the alarm, and actuates them simultaneously, or nearly so, consists, in the present instance, of a turning center shaft, O, organized for operation below the register mechanism, the shaft passing through a central opening in the bell M into a bearing in the base-plate D, in which its lower end turns, while the upper end of said shaft is supported in a bearing above the alarm-bell in a suitable plate, D', secured to posts rising from the base-plate D. This turning-shaft has fixed upon it, above the alarm-bell, a toothed sector, O', the teeth of which mesh with the corresponding teeth formed upon the outer end of a sector or arm, P, the inner end of which is mounted upon the shaft or axle F, and turns or vibrates thereon when actuated by the turning-shaft O. The vibrating sector or arm P carries two driving or actuating feed-pawls, $p\ p'$, (clearly shown in Fig. 5,) one of which (the pawl $p$) drives or actuates the center hub, F, and consequently the general register, by engaging with the teeth of the ratchet-wheel F' of said hub, while the pawl $p'$ actuates the trip-register disks by engaging the teeth or notches formed in the edge or periphery of said disks, (or in the tens-disk J and units carrying-plate I',) each actuation of the turning-shaft O and vibration of the sector or arm P turning the units-disk one-tenth of a revolution, and also turning the hub F one-tenth of a revolution, which movement of said hub is communicated through the gearing to the units-wheel of the general register-train.

As the hub F is turned by the actuating-pawl $p$ acting upon the ratchet-wheel F', it will be obvious that the hammer-lever N will be tripped or raised by each successive tooth of the wheel $F^2$ during the rotation of said wheel, whereby, owing to the force of the spring $m$, the hammer, when released from the tooth that raises it, will be brought down quickly upon the bell and sound the alarm.

The pawl $p'$ is, in fact, a double pawl—that is, it has two actuating points or ends, $p^2$ $p^3$, the one $p^3$ (the top one) being a little back or in rear of the one $p^2$. The actuating-point $p^2$, as the vibration of the sector or arm P takes place in the process of counting, acts upon the teeth of the units-disk carrying-plate I', while the point $p^3$, which is the one that actuates the tens-disk J, is out of engagement with the actuating-teeth in the edge of the tens-disk, the point $p^3$ continuing out of actuating contact with the said tens-disk until the repeated actuation of the turning-shaft, and consequent movement, step by step, of the units-disk carrying-plate, brings the deep notch $i'$ of said plate I' next the pawl $p'$, which pawl, on the tenth movement of the turning-shaft actuator O and vibration of the sector or arm P, if the register has been started at zero, vibrates into said deep notch $i'$, carrying the actuating-point $p^3$ into engagement with one of the actuating-teeth of the tens-disk J, turning said disk one-tenth of a revolution, or the distance of one notch, which method of operating registering mechanism by a double pawl and deep notch, broadly considered, is well known, and is shown, for instance, in my aforesaid patent of August 12, 1879.

The turning-shaft actuator O is provided outside the register-casing with a suitable knob or handle, $O^2$, to turn it, a movement of the knob to the left carrying or vibrating the driving-pawl-carrying sector or arm P to its proper position to permit the actuating-pawls $p$ $p'$ to engage, respectively, the actuating ratchet-wheel F' of the general register and teeth in the disks of the trip-register, while a reverse movement, or a movement to the right, carries the registers one point, or the distance of one tooth, the movement of the actuating-knob $O^2$ being limited to about one-third of a revolution.

The knob, it will be observed, in the present organization, is positively turned backward and forward to vibrate the pawl-carrying sector or arm P to actuate the register.

In order to keep the units-disk carrying-plate I' in proper working position I prefer to mount upon the sector or arm P, outside the pawl $p'$, which actuates the trip-register, a plate, Q, having at one end a forked arm, $q$, one of which arms lies under and the other above said plate I', while said plate Q and the sector arm P are prevented from rising by projections $q'$, extending from the fixed plate D', which forms the upper bearing of the turning actuator-shaft. The plate Q also prevents the sector or arm P from coming in contact with the bell.

Upon the lower end of the turning-shaft actuator O, next the base-plate D, is formed or mounted a sector-plate, R, having, preferably, V-shaped teeth formed in its curved edge, which, in connection with a shifting detent-dog, $r$, pivoted to the base-plate, and acted upon by a spring, compels a complete movement of the register knob or handle in either direction of its movement before it can be reversed, it being necessary to carry the toothed sector out of engagement with the detent-dog to reverse the movement of the handle or knob and its shaft, whereby a full movement of the knob must be made in both directions, and, consequently, all danger of sounding the alarm without actuating the register is avoided. The lower end of the actuator-shaft O also carries another spur-toothed sector, S, the teeth of which, when the shaft is moved in the process of registering, mesh with similar teeth formed in the long arm of a double sector-lever, T, fulcrumed at $t$, the teeth $t'$ of the short arm of said lever meshing with spur-teeth $u$, formed in the edge of a slide-bar, U, carrying at its upper end a punch or cutter-bar, $u'$, the upper end of the punch-bar, upon the upstroke of the slide-bar U, being carried across a ticket-slot in the ticket-head U', outside the register-casing, the punch-bar moving endwise in an axial bore of the ticket-head in a well-known way.

By the organization of punch and leverage described I obtain great power for canceling tickets or trip-slips.

The operation of the machine thus far described is as follows: At each movement of the actuating-knob $O^2$ from left to right the sector O', meshing with the sector-arm P, vibrates or moves said sector-arm, engaging its actuating-pawl $p$ with the ratchet-wheel F' of the hub F, and the pawl $p'$ with the teeth of the units-disk carrying-plate I', thereby turning the units-disks of both the trip and general registers the distance of one tooth or one-tenth of a revolution, the hammer being tripped at the same time to sound the alarm by the teeth of the ratchet-wheel $F^2$, while the punch is reciprocated by the sector S through the intermediate lever-connection. The movement of the knob, when completed, is then reversed—that is, said knob is turned toward the left to bring the parts into position for a new actuation, the actuations continuing consecutively as each fare is received. At the tenth actuation of the knob the units-wheel of the general register turns the tens-wheel of that register one point, as before described, which operation continues throughout the series of wheels, while at every tenth actuation of the units-disk of the trip-register the pawl $p'$, which has hitherto been kept from engagement with the teeth in the tens-disk, (owing to the long point $p^2$ of said pawl bearing against the units-disk carrying-plate I',) vibrates into the deep notch $i'$ of the said units disk carrying-plate I', carrying its actuating-point $p^3$ into engagement with a tooth of the tens-disk J, turning said disk, in connection with the units-disk I, one point or one-tenth of a revolution, the trip-register then showing a record of ten actuations of the knob or actuator, and consequently that number of fares collected, while a like record or increase is shown by the permanent register.

To prevent the momentum of the trip-disks from carrying them farther than they should travel at each actuation, or as each count is being made, as well as to prevent the actuating-hub F of the general register from traveling too far when actuated, I provide a positive automatic lock consisting, by preference, of a lever, V, pivoted at $v$ on a bracket or extension of the horseshoe-shaped supporting-plate C, and provided with two teeth or projections, $v'$ $v^2$. The tooth $v'$, when the hub F has been turned the proper distance at each actuation, vibrates into engagement with one of the notches in the actuating-wheel F', securely holding said hub from further rotation until the tooth $v'$ is retracted, while the tooth $v^2$ vibrates into one of the actuating-notches formed in the edge of the trip-disk J and units-disk carrying-plate I', the lever being vibrated upon its pivot at proper intervals to carry the teeth into engagement with the wheels and retract them therefrom by camming-projections $p^4$ $p^5$, carried by the hub of the sector or arm P, as clearly shown in Fig. 5. As the vibrating arm or sector P is moved from left to right in making a registration, the cam or projection $p^4$ acts against the upper end of the lever V, rocking it on its pivot and bringing its teeth into engagement with the wheels, as above mentioned, to stop their momentum and lock them at the proper point, while as the vibrating arm or sector is moved from right to left to place its actuating-pawls in position for a new registration the cam or projection $p^5$ acts upon the lever below its pivot, thereby carrying the teeth of the lever out of engagement with the actuating-notches of the wheel F' and of the trip-disks, leaving the said wheel and disks free to be turned the proper distance at the next succeeding actuation.

I have found this lever V to act as a complete and certain check for the trip-dials, and it not only stops their momentum, but holds the parts firmly in position as each registration is effected.

I have shown in Fig. 5 a fixed stop-piece or projection, V', mounted on the supporting-plate C, to lock the hub-actuating pawl $p$ in the notch of the wheel F' as each registration is completed, and it answers the same purpose of locking the hub as the lever V, but does not lock the trip-dials. I do not contemplate using this stop-piece V', however, in the present machine, as it is comparatively useless when employed in connection with the lever V.

A direction-indicator consisting of a circular plate, W, is mounted above the alarm-bell upon the upper end of the actuating-shaft O, around which, or a tubular extension of the supporting-plate D', in which the upper end of the shaft O is supported, the direction-plate W is free to turn, so as to change at the proper times the visible indications upon the face of said plate, which indicate different directions of travel or trips of the car or vehicle. The face of the direction-plate has, in this instance, near the periphery, and at two points directly opposite each other, the words "Up" and "Down," which would be the proper signs to employ on a road or route running in those directions; but it will be obvious that other words, signs, letters, or marks may be employed, as occasion or circumstances require.

A suitable spring or friction-washer, $w$, is interposed between the upper face of the direction-indicator plate W and the face-plate of the casing in order to preserve the proper working position of said indicator, while a suitable detent dog or pawl, $w'$, prevents back movement of the direction-plate.

The periphery or edge of the direction-indicator plate is provided with teeth or notches $w^2$ at proper distances apart, which are for the purpose of changing the indication of the indicator to indicate a different direction of travel.

In order to afford a conspicuous display of the indication of the direction-indicator, a suitably glass-covered window is formed in the front plate of the casing. (See Fig. 1.)

The resetting or bringing of the trip-register to zero or the starting-point at the end of each trip, or whenever desired, without disturbing the integrity of the record preserved by the general or continuously-counting register, and the shifting of the direction-plate, are accomplished by means of a vibrating pawl-carrying plate or arm, X, mounted and turning at its lower end upon the shaft O beneath the direction-indicator plate W, the said plate or arm X being provided at its upper end, preferably, with a jointed or pivoted pawl, $x$, acted upon by a spring, so as to keep the pawl in engagement with the teeth in the edge of the trip-disks, and with a second pawl, $x'$, to engage the teeth or notches of the direction-indicator plate, whereby, as the pawl-carrying plate is vibrated from right to left, the trip-disks are reset and the direction-indicator shifted.

The pawl-carrying plate X is vibrated, preferably, by a turning-knob, Y, outside the casing, which is connected with and actuates a toothed wheel, Y', inside the casing, said wheel gearing with spur-teeth $x^2$ upon a curved edge of the pawl-carrying plate X, as clearly shown in Fig. 3.

The direction-indicator plate W is so organized and timed by the number and arrangement of the teeth therein relatively to the trip-register that the trip-disks will arrive at zero before the direction-plate has changed its reading, although both the disks and direction-indicator plate are started simultaneously when the resetting movement commences.

It will be noticed that where the pawl first engages the direction-plate to reset it the teeth or notches are closer together than at other points upon the plate, which construction is for the purpose of preventing the possibility of moving the trip-register without also moving the direction-plate, as, were it possible to move the trip-register without moving the direction-plate, a count or registration could be made on the trip-register without making a corresponding count on the permanent register, and without giving an alarm, which would open the door to fraud on the part of the conductor.

To prevent the units and tens disks of the trip-register from being carried past zero when being reset, one tooth in each disk (or more properly one tooth of the tens-disk J and one tooth of the units-disk carrying-plate I') is reduced about one-half its height or extent of projection from the disks, whereby, owing to the guard or arm $k'$ of the three-armed plate K, upon the curved edge of which the pawl $x$ slides, as will be clearly understood by inspecting Figs. 3 and 4, the pawl $x$ is kept from engagement with the disks when moved to their starting position or zero, the shortened tooth being below the edge of the arm $k'$, and consequently out of reach of the resetting-pawl $x$, although sufficiently deep for the engagement of the actuating-pawls in the process of counting. After the trip-disks have reached zero in the resetting operation, the vibration of the pawl-carrying plate X is still continued to complete the shifting of the direction-plate to bring the word or sign indicating a different direction of travel beneath the direction-indicator window.

In order to prevent accidental use of the set-back knob Y for registering, and to make it impossible to change the position of the direction-plate without first setting the trip-register to zero, I provide a locking device which prevents movement of the set-back knob to reset the trip-disks and shift the direction-indicator plate when the actuator-knob is free to be turned in the process of registering, while capable of adjustment, so as to lock the registering-knob, and at the same time release the set-back knob, in order to enable the latter to reset the trip-disks and shift the indicator-plate when desired.

The act of releasing the actuator-knob locks the set-back knob, while the release of the set-back knob locks the actuator-knob, in the organization to be described. Said locking device preferably consists of a pin or bolt, Z, projecting within the casing, and governed by a finger-piece, Z', sliding backward and forward upon the outside of said casing—in this instance to the right of the opening through which the direction-indicator is viewed—the lower end of which pin Z is connected with a sliding hooked end bolt, $z$, adapted, when the actuator-knob $O^2$ is turned to the left, to engage with the shaft O and lock it from turning, an up movement of the slide Z' carrying the pin Z out of engagement with the locking-notch $w^3$ (of which there are two) in the direction-plate W, releasing said plate, while sliding the hooked end of the bolt $z$ into a transverse hole, $o$, in the shaft O to lock it, as clearly shown in Fig. 4. Thus it will be seen that as the direction-plate W is released, by withdrawing the lock-pin from the notch therein, the pawl-carrying plate X may be vibrated to reset the trip-disks and shift the direction-indicator, while a downward movement of the sliding finger-piece carries the pin Z into one of the notches $w^3$ of the plate W, and thereby locks it, while releasing the actuating shaft O from engagement with the bolt $x$, to permit said shaft to be turned or rocked in the process of counting.

In my former patent of August 12, 1879, hereinbefore referred to, I have shown a spring locking-pin to secure the front and back plates of the register-casing permanently together, in addition to the usual fastening devices. In the present instance I prefer to use a screw, $a'$, to permanently fasten the casing, the screw being passed centrally through the set-back knob and screwed into the central fixed shaft or axle, E, thereby clamping said knob, with the front plate, firmly to said shaft E. The said screw $a'$ is provided with a long head, slotted at its outer end, and with a central hole or opening. After the front and back plates of the casing are fitted together and the screw fitted to its seat the head of the screw is cut down with a suitable tool until a point is reached below the slot. It is then necessary, in order to obtain access to the interior of the casing, to remove the set-back knob by drilling out the head of the screw.

I contemplate in this machine to extend one of the arms of the tripod-plate K—for instance, the arm $k^2$—so that the actuating feed-pawl $p$, after having moved the trip-register forward one point or tooth in the process of registering, and being carried back ready for another actuation, will come in contact with this arm or projection and be held out of contact or engagement with the disks till the pawl has moved far enough forward to engage a tooth, when it is allowed to drop in the tooth by the shape of the projection, thus preventing the wear on the pawl and disks or dials both, and also preventing the dials from being fed or carried ahead by the friction of the pawl against the dials before it has reached the notch or tooth.

It may be well to state that I am aware that the feature, broadly considered, of locking the prime mover to prevent actuation of the general register and alarm, while permitting the trip-register to be turned to zero, and when the prime mover is released to prevent the resetting of the trip-register, is very old. I therefore do not broadly claim every arrangement for this purpose, as a claim thus broadly construed would be invalid.

Having thus described my improvements (as embodied in the best way now known to me) in a manner that will enable those skilled in the art to which my invention appertains to make, construct, and use my said improvements, the advantages of which have been practically demonstrated by me, what I claim is—

1. The combination, substantially as hereinbefore set forth, of the actuator-shaft, the vibrating sector or arm carrying an actuating feed pawl or device to actuate a register-wheel, and the sector carried by the actuator-shaft to move said actuating pawl-carrying sector or arm.

2. The combination, substantially as hereinbefore set forth, of the actuator-shaft, the vibrating sector or arm driven by said shaft, and actuating pawls or devices carried by said sector or arm to engage and actuate simultaneously the toothed wheels of independent registering mechanisms.

3. The combination, substantially as hereinbefore set forth, of the turning-shaft actuator, the slide-bar carrying the punch or canceling device, and the sector-lever operated by said actuator to reciprocate or work said punch or canceling device.

4. The combination, substantially as hereinbefore set forth, of the turning-shaft actuator, the vibrating sector or arm carrying devices to actuate registering mechanism, a toothed sector or lever operating a punch or canceling devices, and independent toothed or sector plates carried by the turning-shaft actuator to drive the said sector or arm that carries the register-actuating devices, and the said lever that operates the punch, respectively.

5. The combination, substantially as hereinbefore set forth, of registering mechanism, the rectilinearly-sliding punch-bar or canceling device, the vibrating toothed sector-lever for operating the punch, and the actuator of the registering mechanism simultaneously actuating said registering mechanism and punch.

6. The combination, substantially as hereinbefore set forth, of a register wheel or disk, an actuator which turns it in the process of counting, a series of teeth in the edge of said wheel or disk, one or more of which are of less height than the others, a resetting pawl or device acting upon said teeth and moved backward and forward in bringing or resetting the wheel or disk to zero or its starting-point, and a guard or plate which prevents the resetting-pawl from acting upon the shortened tooth in the disk when the same has been reset or brought to the desired point.

7. The combination, substantially as hereinbefore set forth, of the trip-disks having teeth in their edges to reset them, one of which teeth in each disk is shortened, or of less height than the others, a vibrating pawl-carrier the pawl or device of which acts upon said teeth to reset the disks, and a guard or plate which, when said disks have been brought to zero or their starting-point, prevents further engagement of the resetting-pawl until the register has been operated in the process of counting.

8. The combination, substantially as hereinbefore set forth, of the units and tens disks of the trip-register, the carrying-plate of said units-disk, and a friction spring or device interposed between said units-disk carrying-plate and said tens-disk.

9. The combination, substantially as hereinbefore set forth, of the units and tens disks of the trip-register, the units-disk carrying-plate, a plate interposed between the said tens-disk and carrying-plate, and around the annulus or hub of which the tens-disk turns, and the friction spring or washer carried by the said interposed plate intermediate of said plate and the carrying-plate of the units disk.

10. The combination, substantially as hereinbefore set forth, of a general register, a trip-disk having teeth upon its edge or periphery by which it is actuated simultaneously with the general register in the process of counting, and actuating mechanism common to said general register and trip-disk actuating the trip-disk by the teeth upon its edge.

11. The combination, substantially as hereinbefore set forth, of the units and tens disks of the trip-register, the carrying-plate of said units-disk, between which and the units-disk proper the tens-disk is mounted, and the central shaft or axle around which said disks turn.

12. The combination, substantially as hereinbefore set forth, of the flat trip-disk or its carrier, the vibrating sector or arm carrying an actuating device to turn said disk, and the forked plate carried by said sector or arm to keep the disk in proper working position.

13. The combination, substantially as hereinbefore set forth, of the flat trip-disk or its carrier, the vibrating sector or arm carrying an actuating device to turn said disk, the forked plate carried by said sector or arm to keep the disk in proper working position, and projections or stops to keep said plate and actuating device in proper position relatively to said disk.

14. The combination, substantially as hereinbefore set forth, of the actuating ratchet-wheels of the general and trip registers, the actuator thereof, and the stop-lever governed by the movements of said actuator to stop said ratchet-wheels when actuated at the proper point.

15. The combination, substantially as hereinbefore set forth, of the actuating ratchet wheels or teeth of the general and trip registers, the vibrating sector or arm carrying pawls or devices engaging said wheels or teeth to actuate the registers in the process of counting, the pivoted stop-lever, and the cams or projections of said sector or arm to engage and disengage said stop-lever with the actuating-teeth of the registers.

16. The combination, substantially as hereinbefore set forth, of the trip-disks, the direction-indicator plate, the independent axes of said disks and plate, and the vibrating pawl-carrying arm having independent pawls or devices, one of which acts upon said trip-disks to reset them, while the other acts upon the direction-indicator plate to shift it.

17. The combination, substantially as hereinbefore set forth, of the trip-register, the direction-indicator plate, the vibrating arm carrying pawls or devices to reset the trip-register and shift the direction-indicator plate, the gear-teeth of said pawl-carrying arm, and the wheel or toothed plate gearing with the teeth of said arm and turned by the set-back knob to vibrate said arm.

18. The combination, substantially as hereinbefore set forth, of the registering mechanism, its actuator, the direction-indicator plate, and the adjustable mechanism capable of locking said indicator-plate while releasing said actuator to enable it to work the register in the process of counting, or of locking the actuator while releasing the plate to enable it to be shifted.

19. The combination, substantially as hereinbefore set forth, of the general register, the trip-register, the actuator of said registers, the direction-indicator, the resetting or shifting mechanism of said trip-register and direction-plate, and mechanism which locks the actuator of the register when the resetting and shifting mechanism is free to be moved, while it locks said resetting and shifting mechanism of the trip-register and direction-plate when the actuator is in condition for working the register in the process of of counting.

20. The combination, substantially as hereinbefore set forth, of the actuator of the registering mechanism, the direction-indicator, the locking-notches of said indicator, and the adjustable finger-piece, which in one position engages a connection thereof with one of said notches in the direction-plate to lock it from turning while releasing a locking device from locking contact with the actuator of the register, and which in another position releases the direction-plate and locks said actuator.

21. The combination, substantially as hereinbefore set forth, of the general register, the trip-register, the actuator common to both of said registers to actuate them in the process of counting, the vibrating pawl-carrying plate, which is actuated to reset the trip-register, and a locking device which prevents the operation of said resetting-plate when the counting-actuator is free to move, while locking said counting-actuator when the resetting-plate is free to be vibrated to reset the register.

22. The combination, substantially as hereinbefore set forth, of the general register-train, the center shaft around which the actuating hub or wheel of said train turns, the alarm apparatus, the actuating pawl-carrying sector or arm vibrating around said shaft as a center to actuate said hub or wheel and sound the alarm, the turning-shaft actuator to move said actuating pawl-carrying sector, the shifting-pawl, and the toothed plate or sector fixed upon said turning-shaft, with which the shifting-pawl engages to compel a full movement of the shaft in both directions.

23. The combination, substantially as hereinbefore set forth, of the back plate of the casing, the front plate thereof, the axle or shaft fixed to the said back plate, around which the trip-registering mechanism is free to turn, and the screw for permanently fastening the sections of the casing together, inserted through the turning set-back knob of the register into an opening in the front end of said fixed shaft.

In testimony whereof I have hereunto subscribed my name.

JOHN B. BENTON.

Witnesses:
WM. S. BEAMAN,
ANTHONY GREF, Jr.